(No Model.) 3 Sheets—Sheet 1.

H. P. NICHOLS.
ROTARY HARROW.

No. 359,626. Patented Mar. 22, 1887.

Attest
Paul A. Staley
C. C. Shepherd

Inventor
Harrison P. Nichols
By his Attorney
George P. Barton (No Model.) 3 Sheets—Sheet 2.
H. P. NICHOLS.
ROTARY HARROW.
No. 359,626. Patented Mar. 22, 1887.
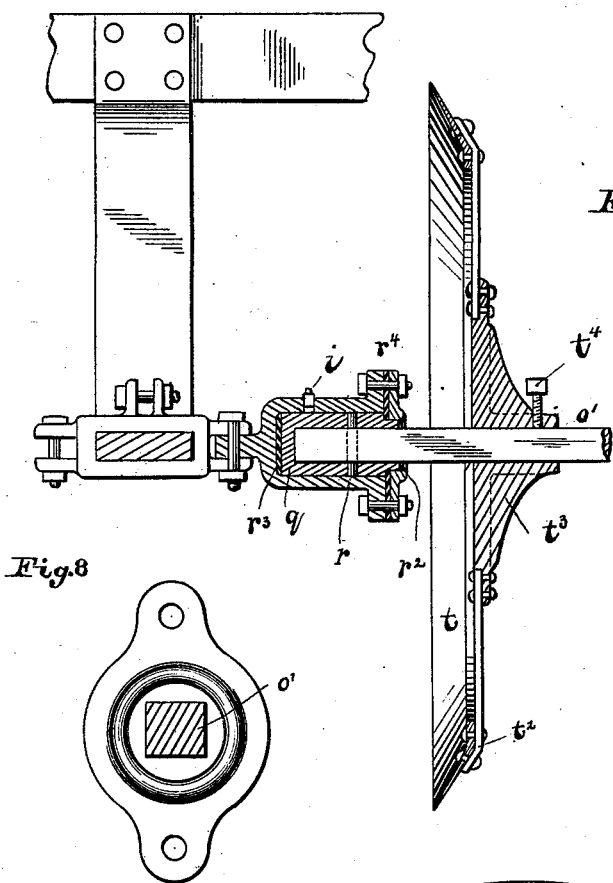
Fig.3
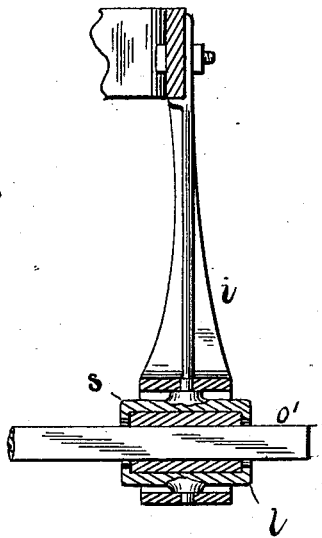
Fig.8
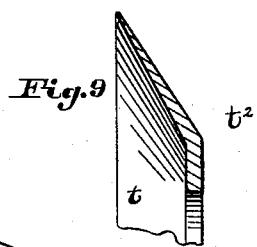
Fig.9
Fig.4
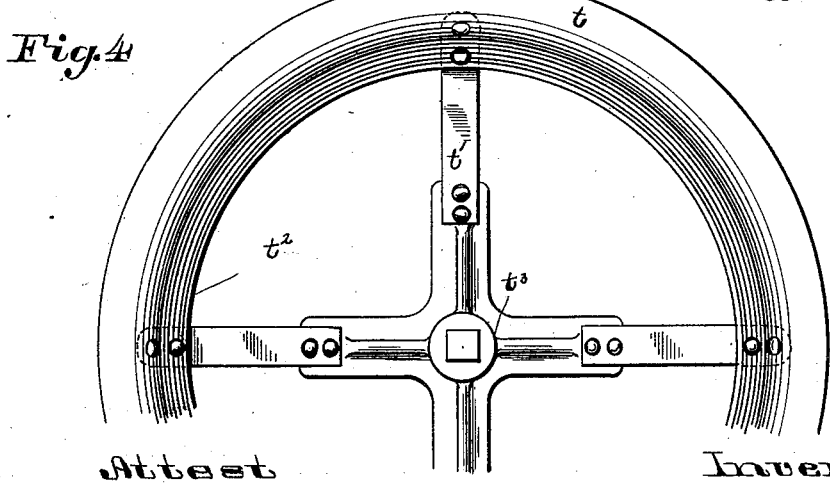
Attest
Paul A. Stalup
C. C. Shepherd
Inventor
Harrison P. Nichols
By his Attorney
George P. Barton (No Model.) 3 Sheets—Sheet 3.
H. P. NICHOLS.
ROTARY HARROW.
No. 359,626. Patented Mar. 22, 1887.
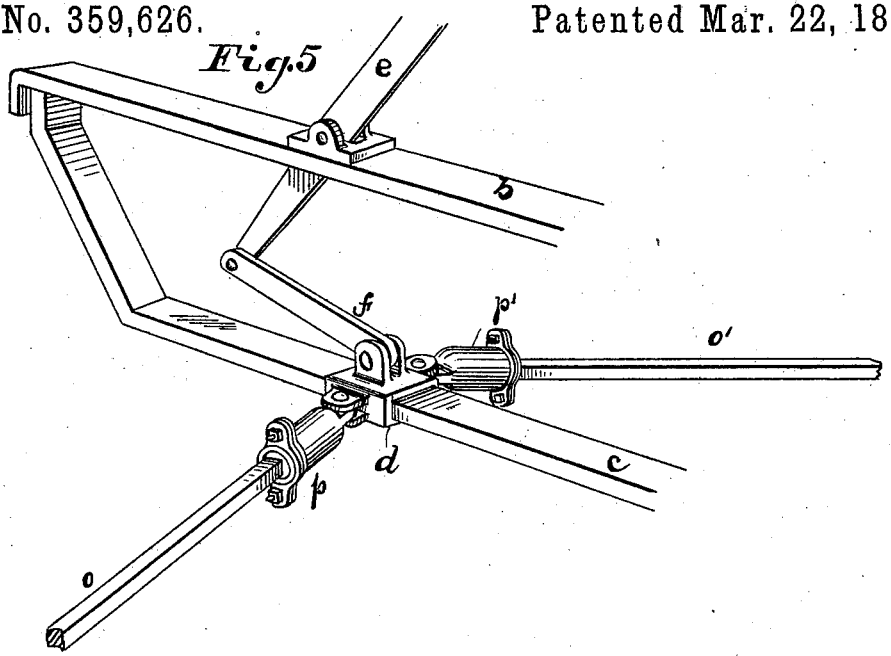
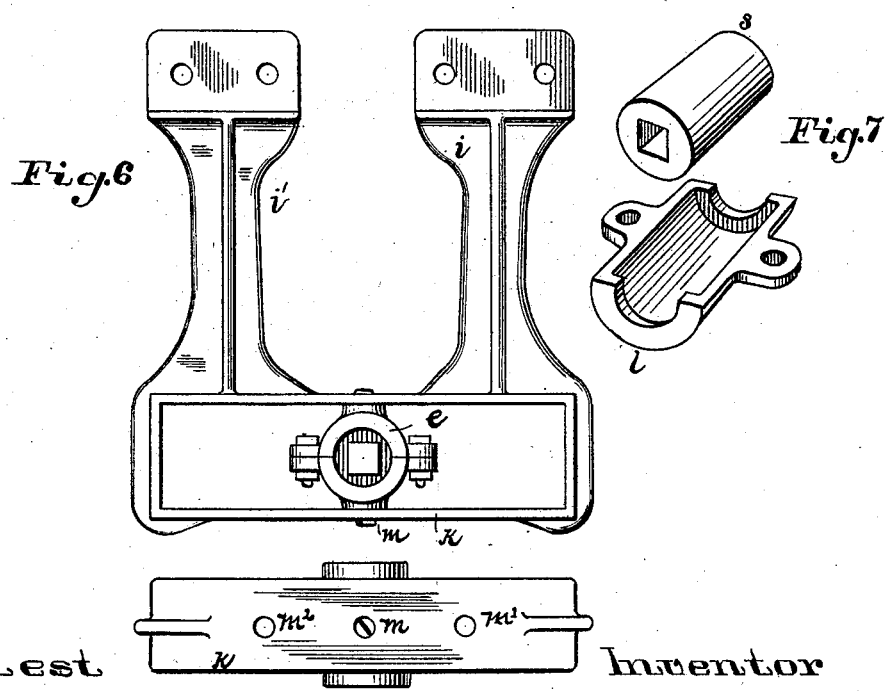
Attest
Paul A. Staley
C. C. Shepherd
Inventor
Harrison P. Nichols
By his Attorney
George P. Barton

UNITED STATES PATENT OFFICE.

HARRISON P. NICHOLS, OF MAYWOOD, ILLINOIS.

ROTARY HARROW.

SPECIFICATION forming part of Letters Patent No. 359,626, dated March 22, 1887.

Application filed February 25, 1884. Serial No. 121,999. (No model.)

*To all whom it may concern:*

Be it known that I, HARRISON P. NICHOLS, a citizen of the United States, residing at Maywood, in the county of Cook and State of Illinois, have invented a certain new and useful Improvement in Rotary Harrows, of which the following is a full, clear, concise, and exact description, reference being had to the accompanying drawings, forming a part of this specification.

My invention relates to rotary harrows which are designed to be used for shallow plowing; and it consists in attaching the shafts which carry the blades to central adjustable bearings; in providing outward adjustable bearings for the shafts; in mounting the disks or knives upon the shafts in such manner that they may be placed at any desired distance apart, as the character of the soil may require, and making the disks or blades reversible and of such form that they may enter the soil with the least resistance, as herein described and set forth in the combinations claimed.

Figure 1:
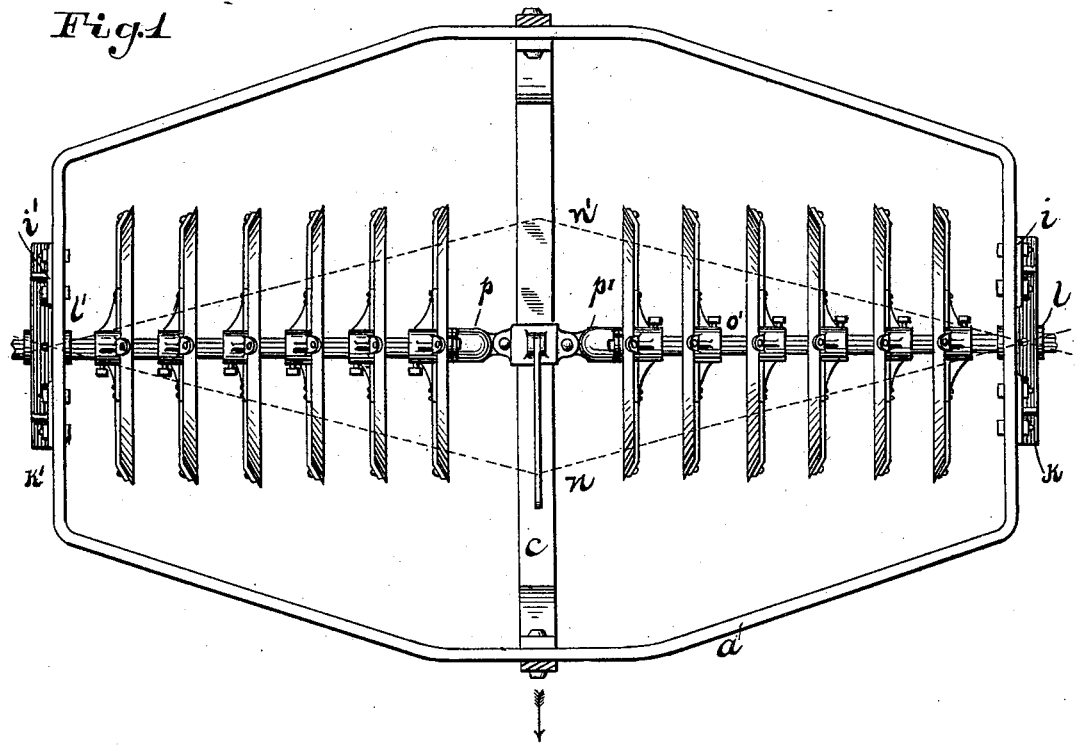
Figure 2:
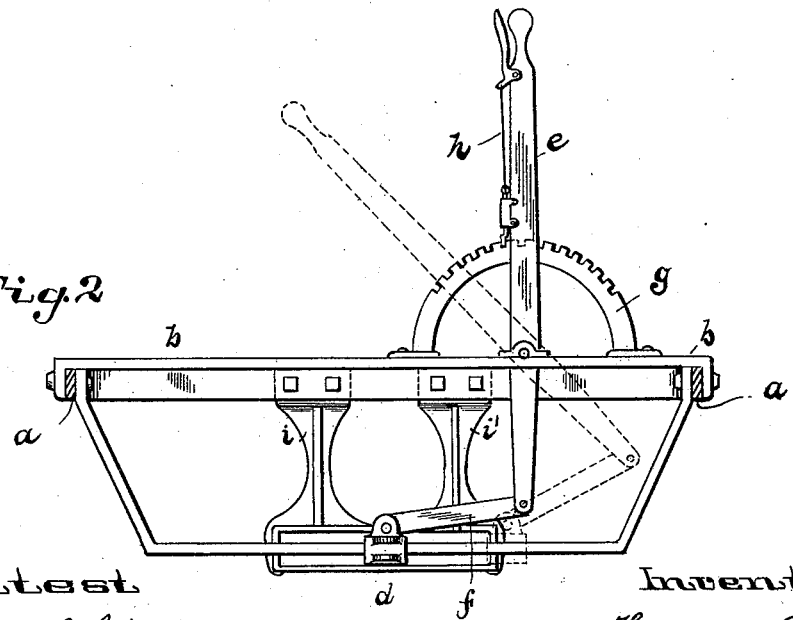

In the drawings, which are illustrative of my invention, Figure 1 is a top view of a rotary harrow embodying my improvements, the dotted lines indicating the angles to which the shafts may be adjusted, the central cross-piece being removed for the purpose of showing the coupler upon the center beam between the center bearings of the shafts. Fig. 2 is a detailed view of the lever for moving the adjustable coupler with the segment mounted upon the central cross-piece, the segment being provided with notches to receive the dog, by means of which the lever may be held in any desired position. Fig. 3 is a detailed longitudinal sectional view of the central coupler, one of the central bearings pivoted thereto, one of the blades or disks mounted on the square shaft, and one of the outward bearings. Fig. 4 is a detailed elevation showing the manner of attaching the annular blade to the frame or arms of the disk. Fig. 5 is a perspective view showing the manner of adjusting the shafts to the angle desired. Fig. 6 is an end elevation and a view from below, showing the brackets and the frame or support for one of the outward bearings. Fig. 7 shows detailed perspective views of an outward skein and its bearing. Fig. 8 is an elevation showing the cap of one of the central bearings or hubs. Fig. 9 is a detailed sectional view of the blade, showing the form which I have found best adapted to enter and invert the soil.

Like parts are indicated by similar letters of reference throughout the different figures.

The frame $a$ may be of iron, and is preferably of the form shown in Fig. 1. The central cross-piece, $b$, extends across the frame, as shown in Fig. 2. The center beam, $c$, (shown in Figs. 1, 2, and 5,) is bolted to the frame $a$ directly under the cross-piece. The movable coupler $d$ is mounted upon the center beam, $c$, and is adapted to be moved thereon and secured at any desired point by means of suitable mechanism. I prefer to use the lever $e$, pivoted to the arm $f$, and forming therewith a toggle or knee joint. By means of the segment $g$ and the dog $h$ the lever may be secured in any desired position. A platform may be placed upon the cross-piece with a seat for the driver. I have not shown the platform, as it may be constructed in any suitable manner, and is too well known to require description.

To the ends of the frame $a$, I bolt the brackets $i$ and $i'$. One set of brackets is shown in detail in Fig. 6, a sectional view thereof being shown in Fig. 3. The brackets $i\ i'$ carry, respectively, the supports $k\ k'$ for the boxes $l\ l'$ of the journals. These supports are provided with the holes $m\ m'\ m^2$, so that the boxes of the journals may be secured in different positions. Ordinarily the box is pivoted at the central opening, $m$, as shown in Figs. 1 and 6.

I will now describe the shafts and the means by which they may be placed at different angles, as indicated by the dotted lines $n$ and $n'$ of Fig. 1.

Referring now to Figs. 3 and 5, it will be seen that the shafts or disk-gangs $o\ o'$ are connected with the hubs $p$ and $p'$, which are pivoted to the coupler $d$. This coupler is adapted to slide back and forth upon the center beam, $c$, and to be secured at any desired point thereon, as hereinbefore described.

I have thus described means by which the shafts may be moved back and forth within the bounds indicated by the dotted lines $n\ n'$ in Fig. 1.

I will now describe in detail the bearings of the shafts which I have designed especially for use with my rotary harrow. Since the shafts must be used at different angles, according to the condition of the soil and the work required, provision must be made for the strain which is thus brought upon the bearings.

Referring now to Fig. 3, the shaft $o'$ at the inner end is provided with skein $q$, attached thereto rigidly, preferably by means of the pin $r$. The hub $p'$ is provided with an opening for oiling the bearings, as shown at $r'$. This opening is closed by means of a thumb-screw or in any other suitable manner. The cap $r^2$ (for detail see Fig. 8) is bolted to the hub, as shown. The washer $r^3$ should be of sufficient thickness to prevent any unnecessary lateral movement of the shaft within the hub. The packing $r^4$ is placed between the cap and the hub, and is designed to keep out dust and prevent the oil from leaking. The outer end of the shaft $o'$ passes through the skein $s$, which is provided with an opening of such size that the shaft may move laterally therein, as is necessary when the angle of the shafts is changed.

The outward bearing of the shaft $l$ consists of two semi-cylindrical pieces, as shown in Figs. 6 and 7. The bearing thus formed is pivoted to the support $k$, as before described, so that it may keep in line with the shaft as the shaft is adjusted to different angles.

I will now describe the disks and the manner of mounting them upon the shafts, and the means for adjusting them at different distances, and the manner in which they may be reversed from time to time.

As shown in Figs. 3, 4, and 9, the disks consist each of an annular blade, $t$, or knife, mounted upon the arms $t'$. The different blades are turned or bent preferably at the angle $t^2$. (Shown in Fig. 9.) The blades at this angle are best adapted to enter and invert the soil.

Referring to Figs. 3 and 4, it will be seen that the disks are adapted to turn with the shaft, the shaft being square, or otherwise provided with a shoulder for keeping the disks from turning thereon. The hub $t^3$ of each of the disks is provided with an opening corresponding to the shape of the shaft. By means of the set-screws $t^4$ the disks may be secured at any desired distance apart upon the shafts.

When the shafts carrying the disks, as shown in Fig. 1, are brought to the angle indicated by line $n$, the machine may be started in the direction of the arrow. The blades will then cut into the soil, and the soil will be turned in furrows toward the center. The pressure of the soil would tend to crowd the different sets of disks away from the center. There being, however, two symmetrical sets of disks, the pressure on one set will be balanced by the pressure upon the other set.

It is sometimes desirable to turn the furrows from the center. In order to do this I simply reverse the disks upon the shafts and change the angle of the shafts to or toward the angle indicated by line $n'$. By starting the machine in the same direction as before, it is evident that the blades will enter the soil at an angle away from the center, and as the different sets of disks turn with their respective shafts the furrows will be turned outwardly, and at the same time the inward pressure of the soil upon the respective sets of disks will be balanced, since the two sets of disks are symmetrical.

My rotary harrow, as thus described, is so light as to be drawn by two horses. It operates successfully upon heavy as well as light soils. If the soil is hard, more disks should be used upon the shafts than are necessary when the soil is light or moist. The depth of the furrows may be regulated by varying the angle of the shafts. The more acute the angle the deeper will be the furrows. I prefer to attach the neap or draft-pole to the upper side of the central cross-piece. The set of whiffletrees may thus be placed below the pole and attached at any desired height to the center beam in any well-known way.

Having now described my invention, I claim as new—

1. In a rotary harrow, the combination, with the shafts provided at their outer ends with adjustable pivoted bearings, of the hubs pivoted to the coupler, said hubs being provided with caps bolted thereto, as described, and means for adjusting the angle of the shafts, substantially as and for the purpose specified.

2. In a rotary harrow, the combination, with the symmetrical disks provided with annular blades adapted to enter the soil substantially at the angle described, of the shafts adapted to turn with the different sets of disks, the adjustable bearings of the shafts, the central coupler, the center beam, the segment provided with notches, the dog, and lever, substantially as and for the purpose specified.

3. The combination, with the sets of brackets $i\ i'$, attached to the frame $a$, of the supports $k\ k'$, each provided with holes $m\ m'\ m^2$, and the journal-bearings $l\ l'$, adapted to keep in line with the journals of the shafts as the shafts are adjusted to different angles, substantially as and for the purpose specified.

4. The combination, with the frame $a$, of central cross-piece, $b$, the center beam, $c$, and the brackets $i\ i'$, carrying the supports $k\ k'$, substantially as and for the purpose specified.

5. The combination of the main frame, the center beam having its ends rigidly secured to said frame, a slide movable along the center beam and provided with the attached boxing, disk-gangs having their inner ends pivoted in said boxing and their outer ends supported by the main frame, and means for adjusting the slide.

In witness whereof I hereunto subscribe my name this 9th day of February, A. D. 1884.

HARRISON P. NICHOLS.

Witnesses:
 GEORGE P. BARTON,
 C. C. SHEPHERD.